(12) United States Patent
Reynolds

(10) Patent No.: US 8,840,960 B2
(45) Date of Patent: Sep. 23, 2014

(54) METHOD OF CLEANING CARBON COMPOSITE PRIOR TO APPLICATION OF THERMAL COATING

(75) Inventor: George H. Reynolds, Sanford, ME (US)

(73) Assignee: United Technologies Corporation, Hartford, CT (US)

( * ) Notice: Subject to any disclaimer, the term of this patent is extended or adjusted under 35 U.S.C. 154(b) by 2441 days.

(21) Appl. No.: 11/590,944

(22) Filed: Nov. 1, 2006

(65) Prior Publication Data

US 2008/0099044 A1    May 1, 2008

(51) Int. Cl.
| | | |
|---|---|---|
| B08B 7/04 | (2006.01) | |
| B05D 3/00 | (2006.01) | |
| C04B 41/53 | (2006.01) | |
| C04B 41/52 | (2006.01) | |
| B08B 3/14 | (2006.01) | |
| F01D 25/00 | (2006.01) | |
| F01D 11/00 | (2006.01) | |
| C04B 41/00 | (2006.01) | |
| C04B 41/91 | (2006.01) | |
| B08B 1/00 | (2006.01) | |
| B08B 3/08 | (2006.01) | |
| C04B 41/89 | (2006.01) | |

(52) U.S. Cl.
CPC .......... *F01D 25/002* (2013.01); *C04B 41/5315* (2013.01); *C04B 41/52* (2013.01); *B08B 3/14* (2013.01); *F01D 11/003* (2013.01); *C04B 41/009* (2013.01); *C04B 41/91* (2013.01); *B08B 1/00* (2013.01); *B08B 3/08* (2013.01); *C04B 41/89* (2013.01)
USPC .......... 427/299; 427/446; 427/453; 427/307; 427/309; 134/10; 134/18; 134/37; 134/42

(58) Field of Classification Search
CPC .......................................... B08B 3/14
USPC .................................. 427/453, 299
See application file for complete search history.

(56) References Cited

U.S. PATENT DOCUMENTS

| 2,233,442 A | * | 3/1941 | Wiley | 428/98 |
| 3,868,485 A | * | 2/1975 | Sykes et al. | 200/61.2 |
| 4,453,721 A | * | 6/1984 | Angus et al. | 277/430 |

(Continued)

FOREIGN PATENT DOCUMENTS

| FR | 2594149 | * | 8/1987 |
| JP | 07-147265 A | * | 6/1995 |

OTHER PUBLICATIONS

Stuecker J.N., Hirschfeld A., Martin S., "Oxidation Protection of Carbon-Carbon Composites by Sol-gel Ceramic Coatings" Journal of Materials Science, No. 34, 1999, pp. 5443-5447, XP002498843 USA.
European Search Report dated Oct. 23, 2008.

*Primary Examiner* — Katherine A Bareford
(74) *Attorney, Agent, or Firm* — Carlson, Gaskey & Olds, P.C.

(57) ABSTRACT

A method of cleaning a carbon work piece includes the step of applying an acetone cleaning agent to the carbon work piece to remove debris therefrom. The removal of debris promotes adhesion between the carbon work piece and a subsequently applied coating. For example, other steps may precede the acetone cleaning step, such as submersing the carbon work piece in deionized water. In one example, a subsequent coating process deposits an alumina coating on the carbon work piece.

6 Claims, 3 Drawing Sheets

(56) References Cited

U.S. PATENT DOCUMENTS

| | | | |
|---|---|---|---|
| 4,873,121 A * | 10/1989 | Struck et al. | 427/77 |
| 5,071,517 A * | 12/1991 | Oabayashi | 205/158 |
| 5,317,901 A * | 6/1994 | Khan | 73/45.5 |
| 5,320,879 A * | 6/1994 | Bullock | 427/576 |
| 5,443,651 A * | 8/1995 | Kalota et al. | 134/2 |
| 5,538,641 A * | 7/1996 | Getty et al. | 210/652 |
| 5,710,373 A * | 1/1998 | Osmanski | 73/53.05 |
| 5,997,979 A * | 12/1999 | Kashima | 428/66.4 |
| 6,682,604 B1 | 1/2004 | Nulwala | |
| 2007/0074737 A1 | 4/2007 | Urena | |

\* cited by examiner

METHOD OF CLEANING CARBON COMPOSITE PRIOR TO APPLICATION OF THERMAL COATING

BACKGROUND OF THE INVENTION

This invention relates to preparation of carbon components for a coating process and, more particularly, to cleaning the carbon component before the coating process with a cleaning agent having a relatively low viscosity for penetrating the carbon component and having a relatively low amount of volatile organic compound ("VOC").

Carbon components, such as carbon seals, are widely known and used in high speed machinery such as gas turbine engines. Typically, the carbon component is coated in a coating process with one or more layers that enhance the durability of the carbon component. To promote adhesion between the layer and the carbon component, the carbon component is cleaned with a cleaning agent before the coating process to remove debris from surfaces of the carbon component.

Traditional cleaning agents have several drawbacks. For example, after cleaning with a traditional cleaning agent, such as methanol, the carbon component is dried at an elevated temperature for up to four hours to vaporize and remove any residual cleaning agent. The time and expense of drying equipment adds to the expense of the carbon component. Moreover, methanol includes relatively high levels of VOCs, which are often regulated by federal, state, or local governments.

Therefore, what is a needed is a cleaning method that reduces or eliminates the need for extensive drying and uses a cleaning agent having cleaning effectiveness at least as good as that of existing cleaning agents but with lower amounts of VOCs. This invention addresses those needs while avoiding the shortcomings and drawbacks of the prior art.

SUMMARY OF THE INVENTION

An example method of cleaning a carbon work piece includes the step of applying an acetone cleaning agent to the carbon work piece to remove debris therefrom. The acetone cleaning agent is of suitable viscosity to deeply penetrate pores of the carbon work piece to remove the debris. For example, cleaning with acetone may be preceded by other steps, such as rinsing or soaking the carbon work piece in deionized water. In one example, the carbon work piece is cleaned in preparation for depositing a coating thereon. In another example, the carbon work piece is ultimately used within a gas turbine engine, such as within a diffuser to seal a chamber having a bearing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
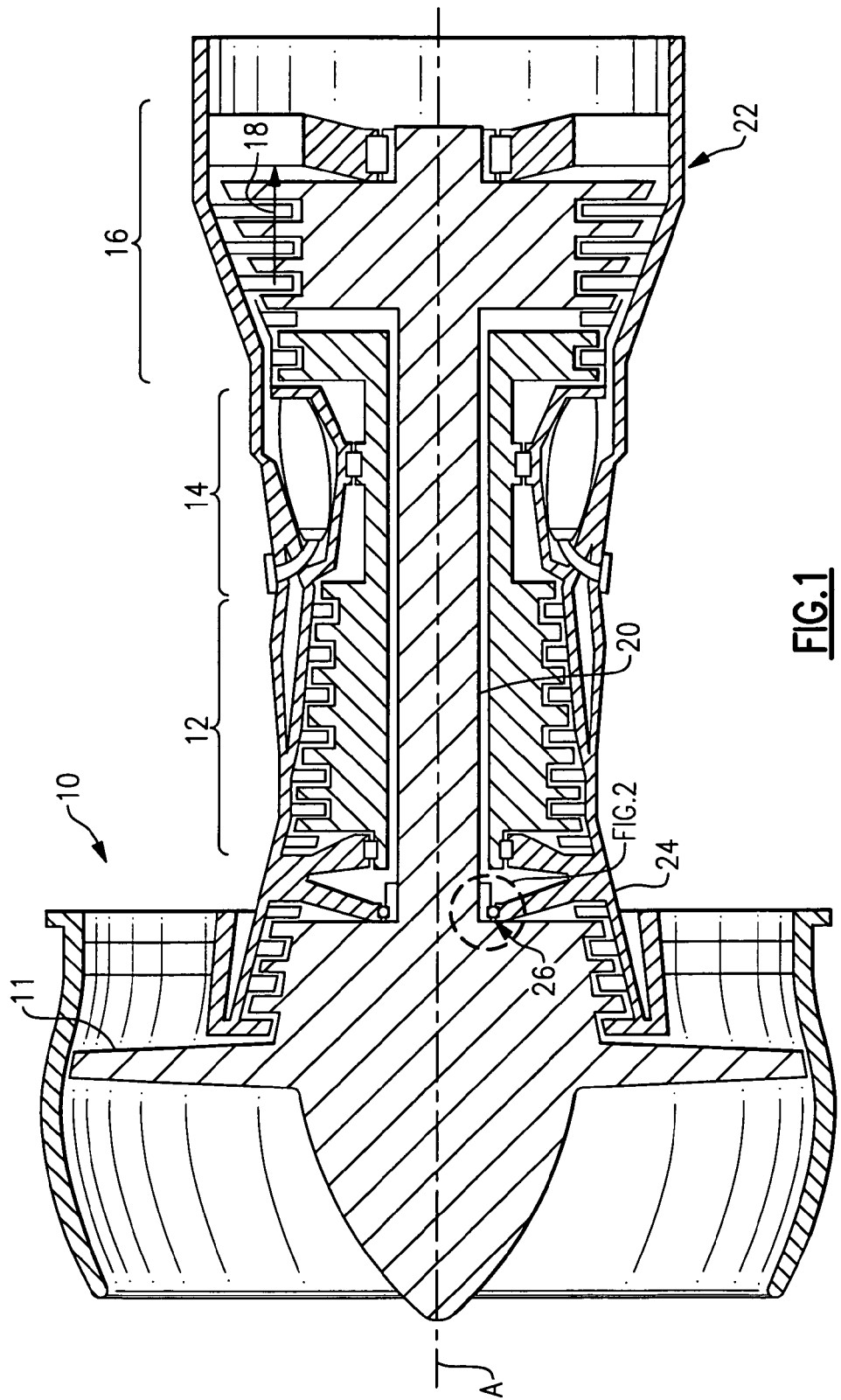
FIG. 1 schematically illustrates selected portions of an example gas turbine engine.

FIG. 1 illustrates selected portions of an example gas turbine engine 10 including a fan 11, a compressor section 12, a combustor section 14, and a turbine section 16. The gas turbine engine 10 operates in a generally known manner, feeding compressed air from a compressor section 12 to a combustor section 14. The compressed air is mixed with fuel and reacts to produce a stream of hot gasses 18. The turbine section 16 transforms the stream of hot gasses 18 into mechanical energy to rotate a drive shaft 20, such as a turbine engine main shaft. The shaft 20 is coupled with the fan 11, the turbine section 16, and the compressor section 12 such that the turbine section 16 drives the fan 11 to produce thrust and drive the compressor section 12. In this example, an exhaust nozzle 22 directs the hot gasses 18 out of the gas turbine engine 10. An annular, non-rotatable case 24 provides support for the shaft 20 on a bearing arrangement 26, such as a No. 1 bearing.

Figure 2:
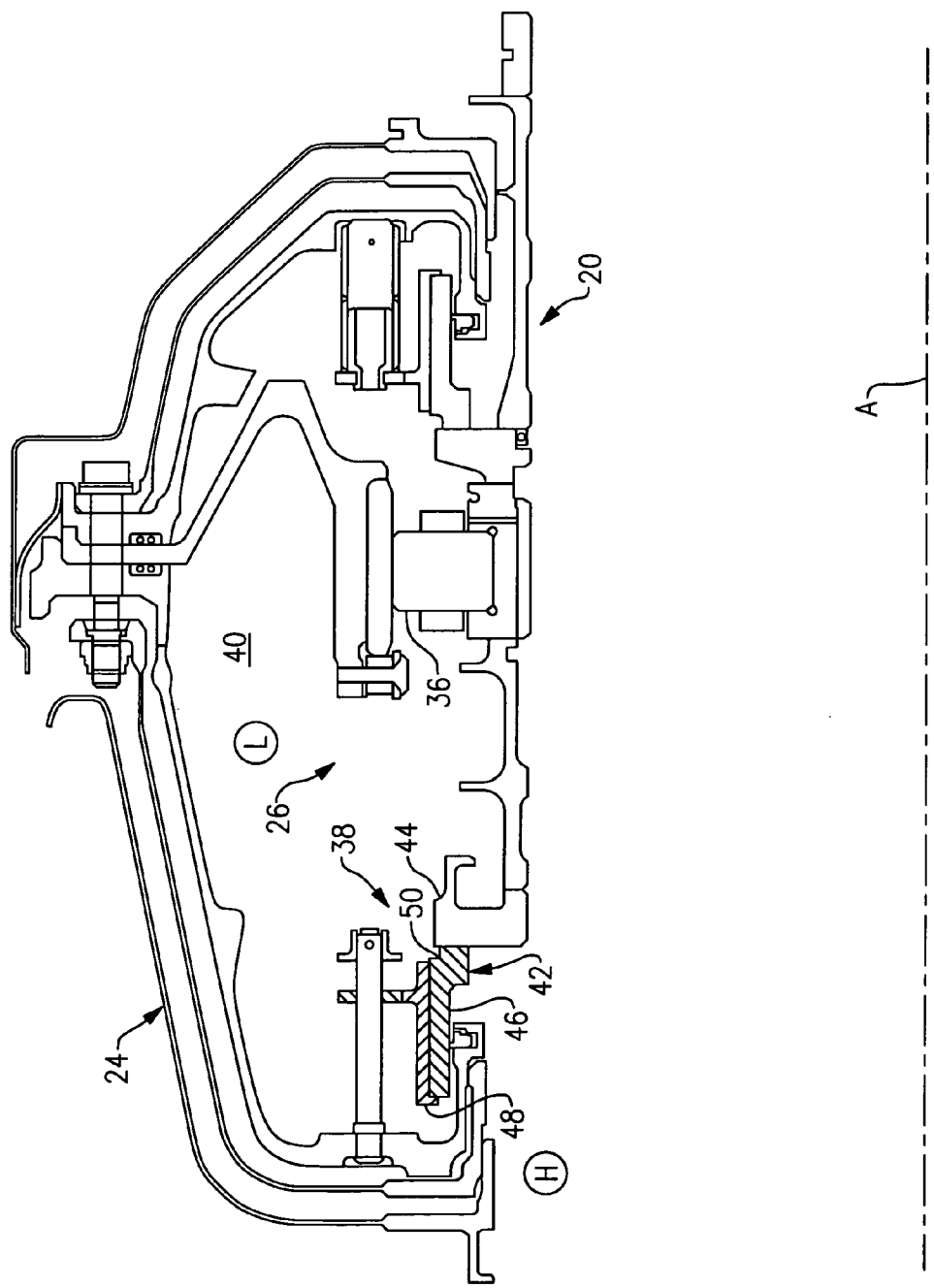
FIG. 2 shows a more detailed view of a bearing arrangement shown in FIG. 1, including a carbon composite seal.

FIG. 2 shows selected portions of the example bearing arrangement 26 shown in FIG. 1. In this example, the bearing arrangement 26 includes a bearing 36 located between the case 24 and the shaft 20 that provides support for the shaft 20, which rotates about a central axis A. A seal arrangement 38 provides fluid restriction between a low pressure and temperature region (L) within a bearing chamber 40 and hot, high pressure region (H) outside of the bearing chamber 40.

Figure 3:
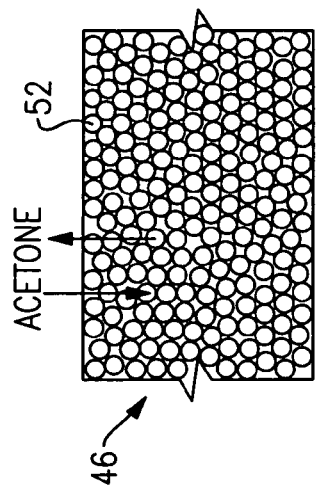
FIG. 3 shows a perspective view of an example carbon composite seal.

In this example, a seal arrangement 38 includes a seal 42 that is non-rotatably secured to the case 24. The seal 42 abuts against a piston ring 44 that rotates with the shaft 20. In this description, one of ordinary skill in the art will recognize alternative gas turbine engine arrangements that will benefit from the examples disclosed herein. The seal 42 in this example includes a carbon composite seal member 46 secured to a metal backing 48, as also depicted in FIG. 3. In other examples, or in other types of uses, the carbon composite seal member 46 is used without the metal backing 48, or with another known type of backing.

In this example, the carbon composite seal member 46 is made of graphitic carbon that is impregnated with a material that enhances the performance of the carbon composite seal member 46. In one example the material includes phosphorous. In a further example, the phosphorous is a phosphorous salt. The phosphorous salt is located within pores within the graphitic carbon and functions to enhance durability of the carbon composite seal member 46.

To further enhance the durability of the carbon composite seal member 46, a coating 50 is deposited onto outer surfaces of the carbon composite seal member 46. In one example, the coating 50 includes aluminum oxide or other suitable inorganic coating to enhance the durability of the carbon composite seal member 46. For example, the coating 50 is deposited using a known thermal spray technique.

Figure 4:
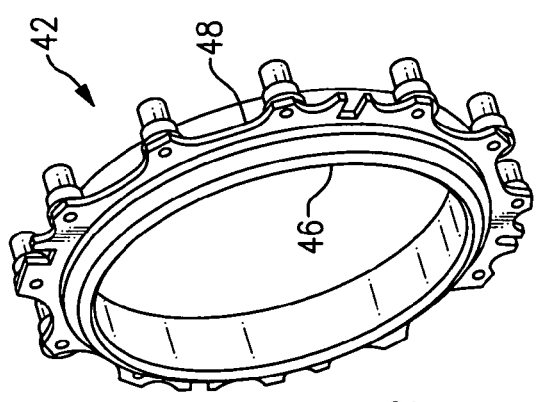
FIG. 4 schematically illustrates pores of a portion of the carbon composite seal.

The carbon composite seal member 46 (i.e. a carbon work piece) is cleaned prior to depositing the coating 50 in order to promote adhesion between the graphitic carbon and the coating 50. The cleaning generally removes debris from the surfaces of the carbon composite seal member 46 and infiltrates into pores 52 of the graphitic carbon to remove debris that may be within the pores 52, as shown schematically for example in a partial view of the carbon composite seal member 46 in FIG. 4.

Figure 5:
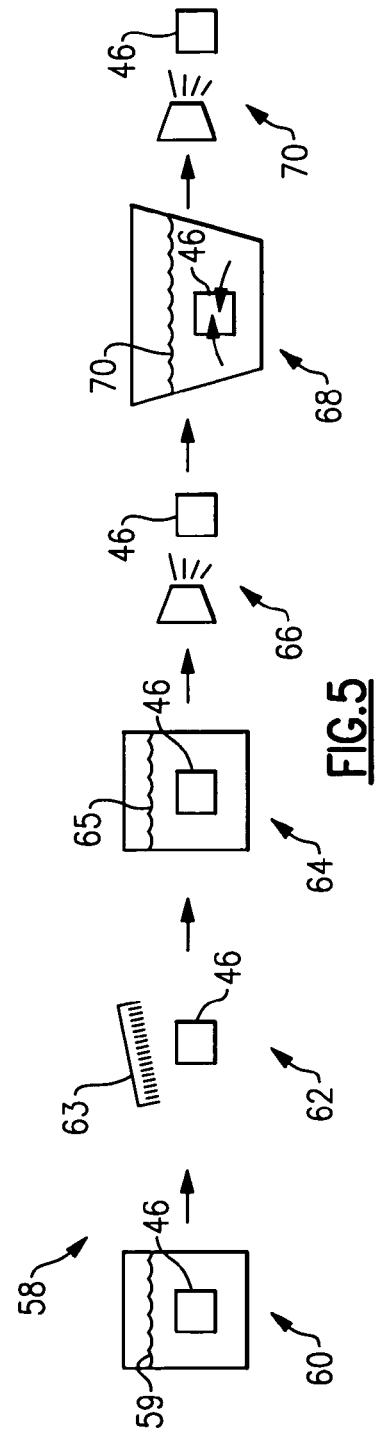
FIG. 5 illustrates selected steps of an example cleaning process for preparing a carbon workpiece to be coated.

Referring to FIG. 5, an example cleaning process 58 is shown. In this example, the carbon composite seal member 46 is first submersed in deionized water 59 at a step 60. In one example, the carbon composite seal member 46 is soaked in the deionized water 59 for about 30 minutes to wash away phosphorous salt residing on the outer surfaces of the carbon composite seal member 46. Removal of the phosphorous salt from the surfaces prevents the phosphorous salts from interfering with the adhesion between the coating 50 and the graphitic carbon.

At step 62, the carbon composite seal member 46 is removed from the deionized water and brushed using a brush 63 to remove any air bubbles on the outer surfaces of the carbon composite seal member 46. For example, the bubbles may inhibit the deionized water 59 from carrying debris out of the pores 52 and also prevent the deionized water 59 from infiltrating the pores 52 to remove the debris.

At step 64, the carbon composite seal member 46 is again soaked in deionized water 65 to further remove debris and to rinse existing debris from the surfaces. In one example, the carbon composite seal member 46 is soaked in the deionized water 65 for about 30 minutes. Upon removal from the deionized water 65 at step 66, the carbon composite seal member 46 is dried in air, for example. In one example, ambient, dry air is blown over the surfaces of the carbon composite seal member 46 to dry it.

After drying, the carbon composite seal member 46 is submersed in an acetone cleaning agent 70. In this example, the carbon composite seal member 46 is completely submersed in the acetone cleaning agent 70 such that the acetone can penetrate into the pores 52 of the graphitic carbon to remove debris that is lodged therein. In one example, the acetone is supplied by Union Carbide and has a viscosity at 25° C. of about $0.306 \times 10^{-3}$ Pa·s. In some examples, the viscosity may vary by as much as 25% or even more, depending on the supplier and whether the acetone is mixed with other substances.

The viscosity of the acetone permits it to penetrate into the pores 52 of the graphitic carbon to remove debris therefrom. Prior cleaning agents that are more viscous are not able to penetrate as far into the pores 52, and therefore are not able to achieve the desired level of cleaning that is possible using acetone. For example, the relatively low viscosity of the acetone permits it to penetrate a farther distance into the pores 52 compared to methanol or water. That is, the distance of penetration depends at least partially on the viscosity of the cleaning agent. Additionally, the acetone also provides the benefit of having a relatively lower amount of volatile organic compounds ("VOC") compared to other type of cleaning agents.

In one example, the acetone cleaning agent is equal or greater than 99% pure. Using acetone of this purity prevents the acetone from leaving residue on or within the carbon composite seal member 46 from impurities in the acetone.

In another example, the acetone cleaning agent 70 used at step 68 is used over several cleaning cycles for different carbon composite seal members 46 proceeding through the cleaning process 58. In this example, the acetone cleaning agent 70 is periodically inspected to ensure it is of suitable quality to properly clean the carbon composite seal members 46. For example, a characteristic of the acetone cleaning agent 70 is measured periodically to determine whether or not it is contaminated. For example, the specific gravity of the acetone cleaning agent 70 is measured and the acetone cleaning agent 70 is discarded in favor of new acetone cleaning agent 70 if the specific gravity is above a threshold level. In one example, the threshold level is about 0.87 (e.g., wherein the initial specific gravity is about 0.79).

In the illustrated example, the carbon composite seal member 46 is then removed from the acetone cleaning agent 70 and dried. For example, dry ambient air is blown over the surfaces of the carbon composite seal member 46 to blow off any remaining acetone cleaning agent 70 or vaporize the acetone cleaning agent 70 from the surfaces thereof.

In this example, the carbon composite seal member 46 is then transported to equipment for depositing the coating 50. In one example, if the carbon composite seal member 46 cannot be coated within a certain time period, the carbon composite seal member 46 is stored in an oven at an elevated temperature, such as 350° F.±25° F., until it can be coated. This prevents the carbon composite seal member 46 from absorbing moisture that may inhibit adhesion between the coating 50 and the graphitic carbon.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A method of cleaning a carbon composite seal member, comprising:
    (a) soaking the carbon composite seal member in deionized water;
    (b) removing the carbon composite seal member from the deionized water and brushing the carbon composite seal member to remove air bubbles therefrom;
    (c) applying an acetone cleaning agent to the carbon composite seal member to remove debris therefrom;
    (d) depositing a coating on the carbon composite seal member and
    (e) reusing the acetone cleaning agent to clean subsequent carbon composite seal members and establishing a threshold contamination level of the acetone cleaning agent based upon a measured characteristic of the acetone cleaning agent wherein said characteristic includes rejecting use of said acetone cleaning agent if a specific gravity of said acetone cleaning agent is above about 0.87.

2. The method as recited in claim 1, wherein said step (b) includes completely submerging the carbon composite seal member in a container holding the acetone cleaning agent.

3. The method as recited in claim 1, further comprising:
    (f) blowing ambient air over the carbon composite seal member to remove the acetone cleaning agent from the carbon composite seal member after said step (c).

4. A method of cleaning a carbon composite seal member, comprising:
    (a) applying an acetone cleaning agent to the carbon composite seal member to remove debris from pores of the carbon composite seal member, and
    (b) reusing the acetone cleaning agent to clean subsequent carbon composite seal members and
    (c) establishing a threshold contamination level of the acetone cleaning agent based upon a measured characteristic of the acetone cleaning agent wherein said characteristic includes rejecting use of said acetone cleaning agent if a specific gravity of said acetone cleaning agent is above about 0.87,
further comprising:
    (d) soaking the carbon composite seal member in deionized water before step (a).

5. The method as recited in claim 4, further comprising:
(e) removing the carbon composite seal member from the deionized water and brushing the carbon composite seal member to remove air bubbles therefrom before said step (a).

6. The method as recited in claim 5, further comprising:
(f) blowing ambient air over the carbon composite seal member to remove the deionized water therefrom.

\* \* \* \* \*